(12) United States Patent
Jeffers et al.

(10) Patent No.: US 7,497,894 B2
(45) Date of Patent: Mar. 3, 2009

(54) PORTABLE AIR SEPARATION/AIR DEHYDRATION SYSTEM

(75) Inventors: Thomas J. Jeffers, Spring, TX (US); Donald E. Newton, Houston, TX (US); Tony Troiano, Richmond, TX (US)

(73) Assignee: Generon IGS, Inc., Houston, TX (US)

( * ) Notice: Subject to any disclaimer, the term of this patent is extended or adjusted under 35 U.S.C. 154(b) by 527 days.

(21) Appl. No.: 11/278,022

(22) Filed: Mar. 30, 2006

(65) Prior Publication Data

US 2006/0230925 A1    Oct. 19, 2006

Related U.S. Application Data

(60) Provisional application No. 60/672,899, filed on Apr. 19, 2005.

(51) Int. Cl.
 *B01D 53/22* (2006.01)
(52) U.S. Cl. .................. 95/45; 95/47; 95/52; 95/54; 96/4; 96/7; 96/8; 96/9; 96/10; 55/385.1; 55/385.3; 55/DIG. 17
(58) Field of Classification Search .......... 95/45, 95/47, 52, 54; 96/4, 7, 8, 9, 10, 11; 55/385.1, 55/385.3, DIG. 17
See application file for complete search history.

(56) References Cited

U.S. PATENT DOCUMENTS

| | | | |
|---|---|---|---|
| 4,264,338 A * | 4/1981 | Null | ............... 95/47 |
| 4,881,953 A | 11/1989 | Prasad | |
| 5,355,781 A * | 10/1994 | Liston et al. | ............ 99/476 |
| 5,960,777 A | 10/1999 | Nemser | |
| 6,764,529 B2 * | 7/2004 | Nichols et al. | ............ 95/52 |
| 6,893,615 B1 * | 5/2005 | Alexander | ............ 422/177 |
| 6,955,704 B1 * | 10/2005 | Strahan | ............ 95/52 |
| 7,296,399 B2 * | 11/2007 | Hoff, Jr. | ............ 55/385.3 |
| 2002/0028168 A1 * | 3/2002 | Giacobbe et al. | ...... 423/212 |
| 2005/0034602 A1 | 2/2005 | Coan | |
| 2005/0235826 A1 | 10/2005 | Jensvold | |
| 2005/0252377 A1 | 11/2005 | Coan | |
| 2007/0125232 A1 * | 6/2007 | Wrosch et al. | ........... 96/4 |
| 2007/0151454 A1 * | 7/2007 | Marwitz et al. | ........... 96/4 |

* cited by examiner

*Primary Examiner*—Jason M Greene
(74) *Attorney, Agent, or Firm*—William H. Eilberg

(57) ABSTRACT

A portable system for air separation or air dehydration, or both, is carried on a truck or equivalent vehicle. The air separation system includes, at a minimum, a feed compressor and a gas separation membrane. The air dehydration system includes a feed compressor and an air dehydration membrane. The feed compressor receives power from the engine of the vehicle, only when the vehicle is not moving under its own power. Heat from the vehicle engine may also be used to heat the compressed air stream to prevent the formation of water. The system can also be used to perform air dehydration and air separation simultaneously. The system is substantially self-contained, and can be easily driven from one location to another, simply by driving the vehicle to another location. The invention is especially useful in providing air separation or air dehydration services, or both, for relatively brief periods, at multiple locations.

11 Claims, 5 Drawing Sheets

PORTABLE AIR SEPARATION/AIR DEHYDRATION SYSTEM

CROSS-REFERENCE TO PRIOR APPLICATION

Priority is claimed from U.S. provisional patent application Ser. No. 60/672,899, filed Apr. 19, 2005, the disclosure of which is incorporated by reference herein.

BACKGROUND OF THE INVENTION

This invention relates to the field of separation of air into components by non-cryogenic means. The invention provides a portable, membrane-based air system, which can be used for air separation, air dehydration, or both. The system of the present invention can be easily moved from one location to another.

The use of polymeric membranes to separate air into components has been known for a long time. An example of a membrane-based air separation system is given in U.S. Pat. No. 4,881,953, the disclosure of which is incorporated by reference herein. A polymeric membrane used for air separation is chosen to exhibit selectivity between oxygen and nitrogen. That is, the membrane tends to pass one component, designated the more "permeable" component, and to resist the passage of the non-permeable component. Such a membrane can therefore separate a stream of air into an oxygen-enriched stream, and an oxygen-depleted (nitrogen-enriched) stream.

A major advantage of a membrane system is that it avoids the expense and inconvenience of using cryogenic liquids. Moreover, a typical membrane system has only one moving part, namely the compressor used to supply compressed ambient air to the membrane unit. Thus, the membrane system has the advantages of inherently low maintenance and low energy consumption.

Although the essential features of a membrane-based air separation system comprise only a compressor and a membrane unit, a practical membrane system may include additional components, such as are illustrated in the above-cited patent. Because compression of ambient air may cause liquid water to appear in the stream, a moisture separator is typically used to remove the water, which would otherwise degrade the membrane. Similarly, a carbon adsorbent may be provided to remove residual hydrocarbons that might be present due to leakage of oil from the compressor. Additional heaters, moisture traps, and/or filters may be included, between the compressor and the membrane unit, as needed.

Membrane units of the prior art do have the disadvantage that they are not portable, and must be set up at each location where air separation is necessary. In many applications, such as in oil drilling, the locations are remote, and the air separation system may be required only for a short period of time at each location. It is expensive and inconvenient to set up and dismantle an air separation system repeatedly, for a plurality of oil drilling sites.

The present invention combines the advantages of a membrane-based air separation system, with the mobility of a truck, by providing a membrane system that is carried on a truck or other vehicle, and powered by the engine of that vehicle.

The combination of a truck with a membrane-based air separation unit is shown in U.S. Pat. No. 5,960,777, the disclosure of which is incorporated by reference herein. However, the system described in the cited patent uses a membrane system only to provide modified air to affect engine performance. That is, the patent uses a membrane system to enhance the operation of the engine of the truck. It does not, in itself, address the problem of the non-portability of air separation systems.

In addition to providing a portable air separation system, the present invention includes a portable air dehydration system, also operated by the engine of a truck. The air dehydration system may be operated either in conjunction with, or separately from, the portable air separation system described above.

SUMMARY OF THE INVENTION

The present invention comprises an air separation system that is carried on a truck or equivalent vehicle. At a minimum, the air separation system includes a feed compressor and a gas separation membrane, the membrane being connected to receive compressed air from the feed compressor, and to separate the air into components. The feed compressor receives power from the engine of the vehicle, but only when the vehicle is not moving under its own power. The engine of the vehicle is connected, through appropriate linkages, either to the drive shaft of the vehicle or to the compressor, but not to both at the same time. Also, heat from the vehicle engine may be used to heat the compressed air, prior to its passage through the membrane, to prevent the formation of water due to condensation.

The air separation system may also include a booster compressor, which raises the pressure of one of the gas streams produced by the membrane. If present, the booster compressor may also be powered by the engine of the vehicle, in the same manner as with the feed compressor, or it may be powered independently, depending on the application. The booster compressor is typically used when it is desired to provide a product gas having a very high pressure, as would be required if the product gas is to be pumped into an oil well, for use as a drilling fluid.

In another embodiment, the air separation system includes a membrane-based air dehydration system. In this embodiment, an air dehydration membrane is used to pretreat the air entering the gas separation membrane. The system is still powered by the engine of the truck.

In another embodiment, the invention includes a portable system for performing air dehydration only. The system comprises a compressor and an air dehydration membrane. The compressor is powered by the engine of the truck.

In still another embodiment, the invention comprises a system which includes both air dehydration and air separation portions operating in parallel. This embodiment performs both air dehydration and air separation simultaneously, and both processes are powered by the engine of the truck. The system produces, in parallel, a stream of dry air, and streams of oxygen-enriched and oxygen-depleted gas.

The invention therefore includes the method of using the air separation/air dehydration system at one location, disconnecting that system, driving the vehicle to another location, and connecting the engine to the compressor(s) so as to operate the system at the new location. Since the air separation/air dehydration system is entirely disposed on the vehicle, it can be quickly and easily moved from one location to another. The invention is particularly useful in well operations where the air separation or air dehydration system is used for fewer than 24 hours at any one site.

The invention therefore has the primary object of providing a portable air separation system.

The invention has the further object of providing a portable air dehydration system.

The invention has the further object of providing a portable air separation system which includes an air dehydration system.

The invention has the further object of providing a portable system for simultaneous air dehydration and air separation.

The invention has the further object of providing an air separation/air dehydration system that is housed on a truck or other vehicle.

The invention has the further object of providing a portable air separation/air dehydration system, wherein the system is powered by the engine of a vehicle when the vehicle is not moving under its own power.

The invention has the further object of providing a method of operating an air separation or air dehydration system for short times, in multiple locations.

The invention has the further object of simplifying the process of providing air separation or air dehydration services for relatively brief times at multiple locations.

The invention has the further object of reducing the cost of providing air separation or air dehydration services for relatively brief times at multiple locations.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
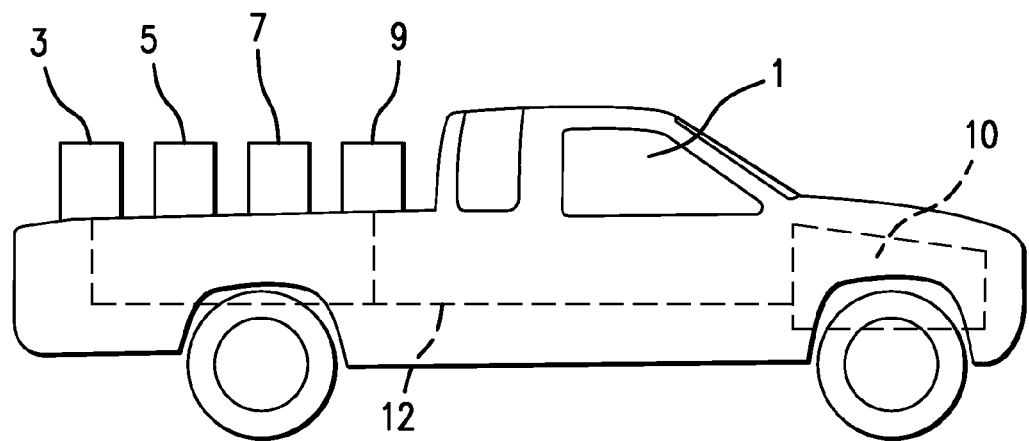
FIG. 1 provides a diagram of a truck that has been equipped with a membrane-based system according to the present invention.

FIG. 1 shows a truck 1 which carries the components of a membrane-based air separation system. In the embodiment shown, the air separation system includes feed compressor 3, moisture separator 5, and membrane unit 7. Depending on the intended use of the air separation system, a booster compressor 9 may also be present. It is understood that still other components, such as those shown in U.S. Pat. No. 4,881,953, and described above, could be included on the truck bed. These other components could be filters, heaters, moisture traps, or other devices.

The truck has an engine 10 which is operatively connected to the feed compressor 3, as indicated by dotted line 12. In particular, the gear shift system of the truck is modified such that, in a first position, the engine is connected to the drive shaft, and in a second position, the engine is connected to operate the feed compressor. When the truck is in motion under its own power, the air separation system is not used, but is merely transported from one location to another. When the air separation system is operating, the truck cannot be moving under its own power, because the engine is connected to operate the feed compressor and not to the drive shaft. If a booster compressor is used, the engine is also connected to the booster compressor, and therefore drives both compressors at once.

Figure 2:
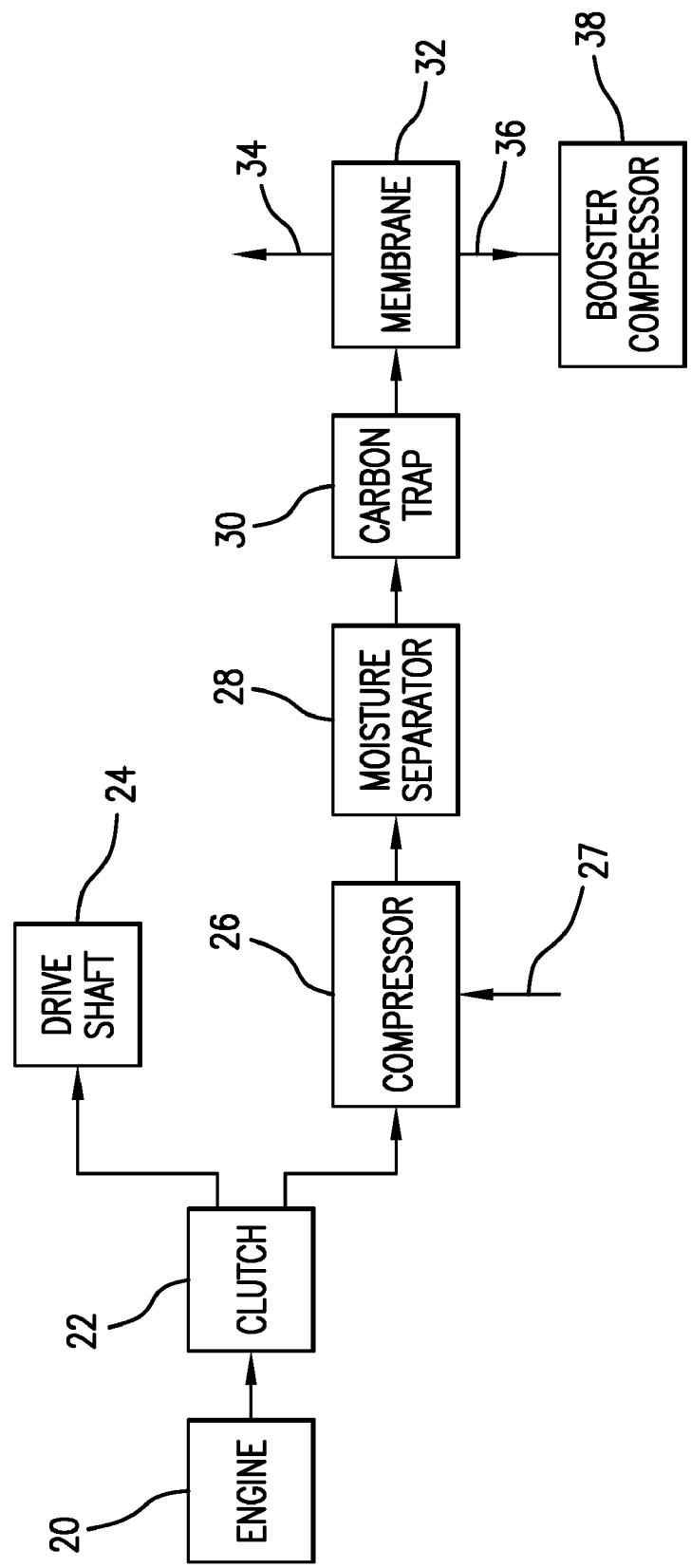
FIG. 2 provides a block diagram showing the major components of a membrane-based air separation system made according to the invention.

The above arrangement is further illustrated in the block diagram of FIG. 2. Truck engine 20 is connected to a clutch 22, which connects the engine either to drive shaft 24 or to feed compressor 26. Ambient air entering the feed compressor at conduit 27 is compressed, and passed through moisture separator 28 and carbon trap 30, before being directed into the membrane unit 32. The membrane unit produces two streams, indicated by arrows 34 and 36, one of which is oxygen-enriched and the other of which is oxygen-depleted (nitrogen-enriched). In the example of FIG. 2, the oxygen-depleted stream is indicated by arrow 36.

Booster compressor 38 compresses the nitrogen-enriched stream produced by the membrane. The booster compressor is powered by the same power source as that of compressor 26, i.e. by the engine of the vehicle. Alternatively, the booster compressor could be powered independently of the vehicle engine, such as by an electric motor, depending on the nature of the application.

A booster compressor is needed when the nitrogen-enriched gas is intended for use in applications requiring high pressure streams, such as in oil drilling. The membrane used for air separation cannot normally handle pressures higher than about 350 psi. In a typical installation, the operating pressure of the system may therefore be in the range of about 100-200 psi, and the booster compressor may increase the pressure of the stream to about 2000-4000 psi. In this way, the nitrogen-enriched stream may be used as a drilling fluid, or for other purposes requiring high pressure.

In some membrane-based air separation systems, there is a heater positioned between the compressor and the membrane, to heat the compressed air stream. Such heating is performed to prevent the formation of water, due to condensation, in the air stream. The heater can be used instead of, or in addition to, the other moisture-removing components shown in the air separation system. If a heating step is used, this step can be performed by transferring heat from the vehicle engine to the compressed air stream, through the use of suitable ducting and heat exchange devices. Thus, the vehicle engine could be used both to drive one or more compressors, and to heat the compressed air stream.

The air separation system of the present invention is therefore entirely self-contained. It can be moved from one location to another, simply by driving the truck to another location, and the air separation system is essentially set up at the new location. This feature is important for applications such as well make-overs, and gas-lift operations, where the air separation system may be needed for no more than 24 hours at any one particular site.

In the present invention, the truck engine either drives the truck, or it drives the air separation system, but not both at the same time. The air separation system of the invention is not intended for use, and cannot be used, while the truck is moving under its own power. The air separation system works only when the engine is disengaged from the drive shaft of the truck, and connected to the feed compressor, and booster compressor (if present).

Figure 3:
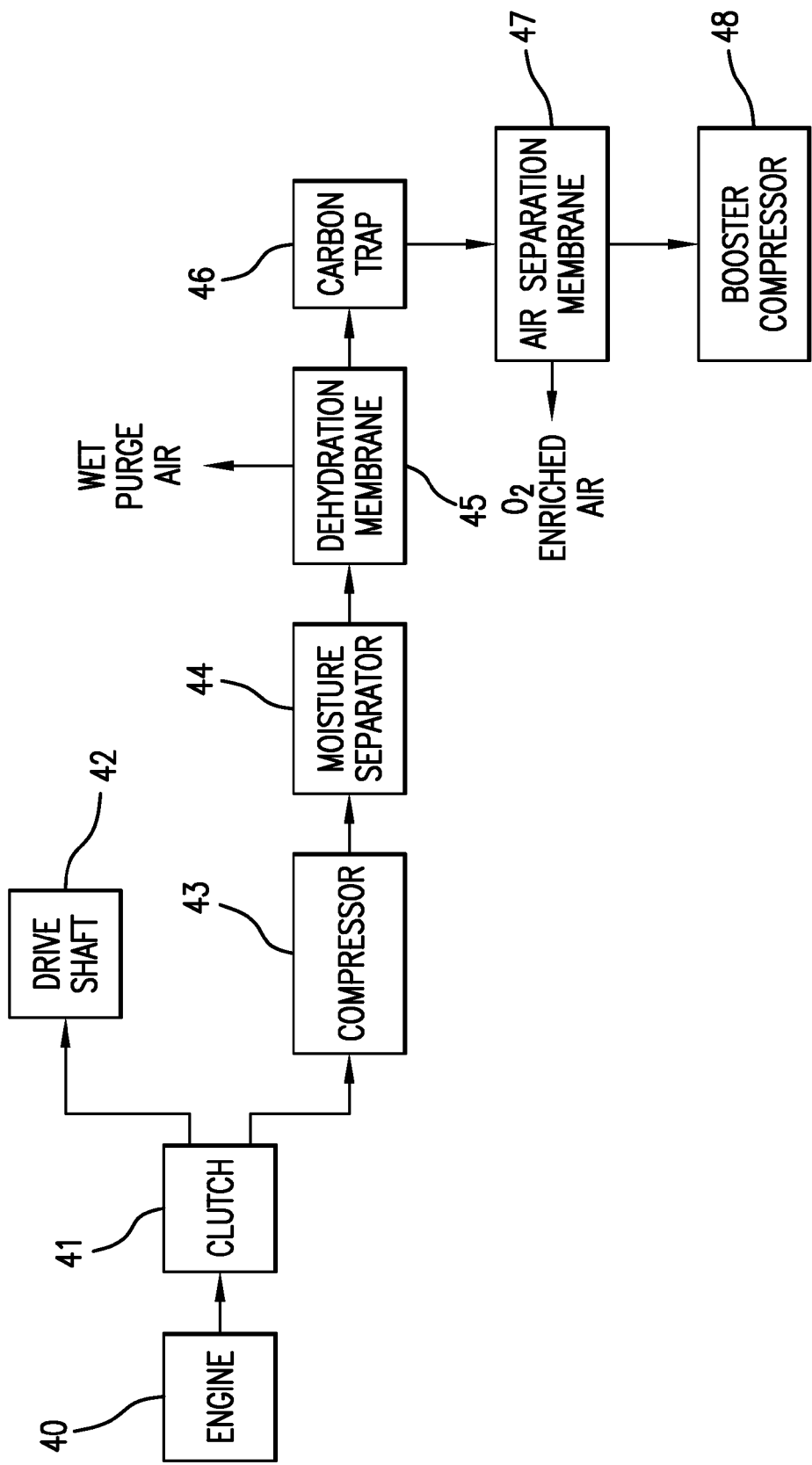
FIG. 3 provides a block diagram showing the major components of another embodiment of the invention, wherein an air dehydration membrane is used for pretreatment of air being separated by a gas separation membrane.

FIG. 3 illustrates another embodiment of the invention, in which a membrane-based air dehydration system is used to pre-treat the air being separated. This system is also powered by the engine of the truck, when the truck is not moving under its own power. In particular, truck engine 40 is connected, through clutch 41, either to drive shaft 42 or to compressor 43.

A moisture separator 44 removes liquid water from the compressed air. The compressed air is then passed through dehydration membrane 45, which produces a stream of wet purge air, and a stream of dry air. The dry air is filtered in carbon trap 46, and passes to air separation membrane 47. The air separation membrane produces a stream of oxygen-enriched air and a stream of oxygen-depleted (nitrogen-enriched) air. The latter stream may be passed through optional booster compressor 48, if a high-pressure stream is desired.

The air dehydration membrane, used in the present invention, may be the same as any of the membranes described in U.S. patent applications Ser. No. 10/640,363 (published as No. US 2005-0034602-A1, on Feb. 17, 2005), Ser. No. 11/101,273 (published as No. US 2005-0235826-A1, on Oct. 27, 2005), and Ser. No. 11/185,049 (published as No. US 2005-0252377-A1, on Nov. 17, 2005), the disclosures of all three of which are hereby incorporated by reference herein.

Figure 4:
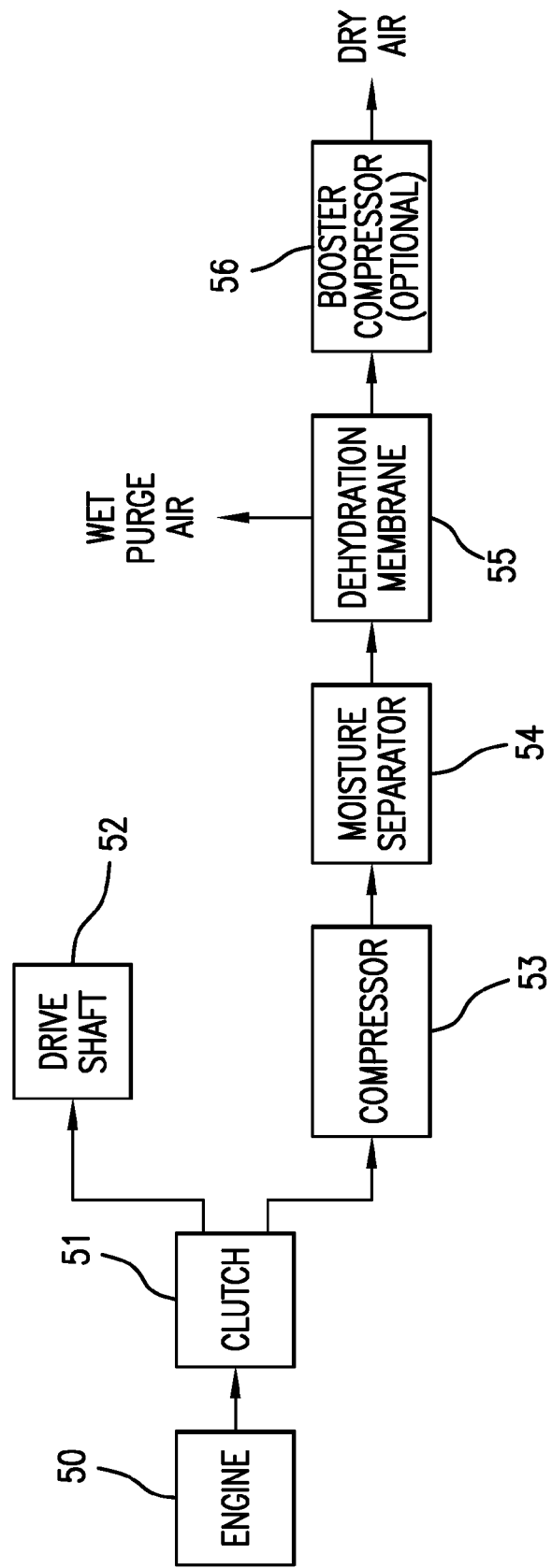
FIG. 4 provides a block diagram showing the major components of another embodiment of the invention, in which the system performs air dehydration only.

FIG. 4 illustrates another embodiment of the present invention, in which the system is used for air dehydration only. Engine 50 of the truck is connected, through clutch 51, either to drive shaft 52 or compressor 53. Compressed air passes through moisture separator 54, to remove liquid water. The resulting air stream passes through air dehydration membrane 55. The dehydration membrane discharges a stream of wet purge air, and has a dry product stream which may optionally be compressed in booster compressor 56. The dehydration membrane may be made according to the teachings of the above-cited references. In this embodiment, the air dehydration system is still portable, because the energy needed to operate the compressor(s) is derived solely from the engine of the truck.

Figure 5:
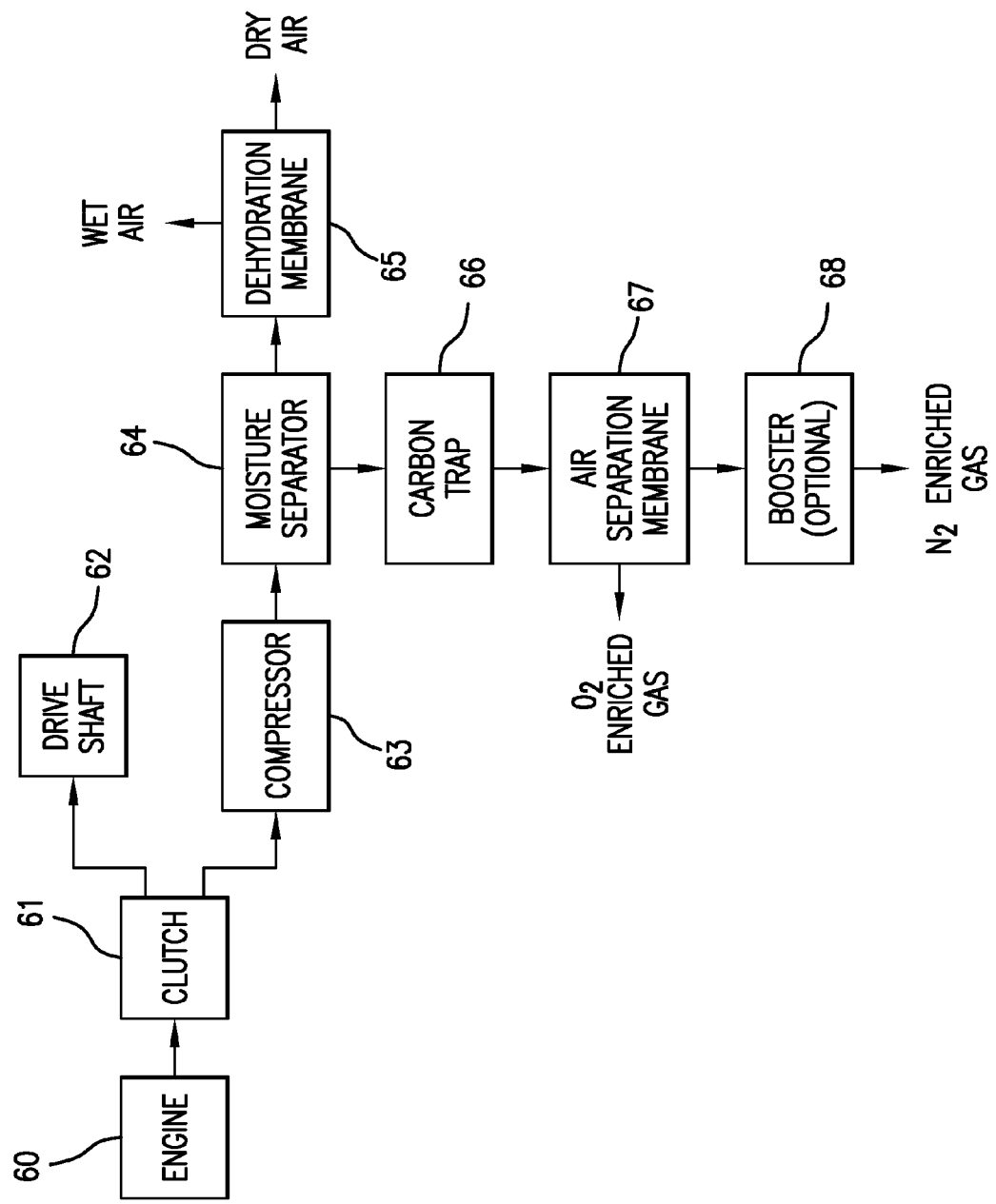
FIG. 5 provides a block diagram showing the major components of another embodiment of the invention, wherein air dehydration and air separation processes are performed simultaneously.

FIG. 5 illustrates another embodiment of the present invention, wherein an air dehydration system and an air separation system operate in parallel. Engine 60 of the truck is connected, through clutch 61, either to drive shaft 62 or to compressor 63. The output of compressor 63 passes through moisture separator 64, which removes liquid water. The output of moisture separator 64 is divided into two streams, one of which passes through dehydration membrane 65. The output of the dehydration membrane is dry air, from which liquid water and water vapor have been removed.

The other output of moisture separator 64 passes through carbon trap 66, and into air separation membrane 67. The membrane 67 produces an oxygen-enriched stream and an oxygen-depleted stream. The oxygen-depleted (nitrogen-enriched) stream may be compressed by optional booster compressor 68. Thus, the system of FIG. 5 converts an incoming stream of ambient air into an extremely dry stream of compressed air, and a pair of streams of oxygen-enriched and oxygen-depleted compressed gas. These streams are all produced simultaneously, and the energy for such production again comes solely from the engine of the truck. As before, the air dehydration membrane may be the same as disclosed in the above-cited references.

The present invention can be practiced with any vehicle that is capable of holding the components of an air separation system, or air dehydration system, or both, and which can be adapted to connect the vehicle engine to the compressor(s) of the air separation and/or dehydration system. The components shown on the truck in FIG. 1 may be modified, according to which of the embodiments of FIGS. 2-5 is used. Thus, figures corresponding to FIG. 1 have not been repeated for the other embodiments.

The invention can be further modified. The specific number and type of components in the air separation/dehydration system, carried on the vehicle, can be modified within the scope of this invention. The above modifications should be considered within the spirit and scope of the following claims.

What is claimed is:

1. A method of non-cryogenically separating air into components at a plurality of locations, comprising:
    a) providing a vehicle which holds a compressor and a gas separation membrane, the vehicle having an engine, the gas separation membrane being connected to receive compressed air from the compressor, the compressor being connected to receive power from the engine only when the vehicle is stationary,
    b) driving the vehicle to a first location, stopping the vehicle, connecting the engine to the compressor, and withdrawing oxygen-enriched and nitrogen-enriched gas streams from the gas separation membrane,
    c) disconnecting the engine from the compressor, and
    d) driving the vehicle to a second location, stopping the vehicle, connecting the engine to the compressor, and withdrawing oxygen-enriched and nitrogen-enriched gas streams from the gas separation membrane.

2. The method of claim 1, further comprising repeating steps (c) and (d) a plurality of times.

3. The method of claim 1, wherein the vehicle is selected to have a booster compressor connected to an output of the gas separation membrane, and wherein the connecting and disconnecting steps include connecting and disconnecting the engine to and from the booster compressor.

4. The method of claim 1, further comprising the step of removing liquid water from the compressed air before passing the compressed air to the gas separation membrane.

5. The method of claim 1, further comprising the step of passing compressed air from the compressor through an air dehydration membrane before passing compressed air to the gas separation membrane.

6. The method of claim 1, further comprising diverting some of the compressed air from the compressor, and passing said diverted compressed air through an air dehydration membrane to produce a stream of dry air, wherein the dry air and the oxygen-enriched and nitrogen-enriched gas streams are produced simultaneously.

7. A method of producing dry air at a plurality of locations, comprising:
    a) providing a vehicle which holds a compressor and an air dehydration membrane, the vehicle having an engine, the air dehydration membrane being connected to receive compressed air from the compressor, the compressor being connected to receive power from the engine only when the vehicle is stationary,
    b) driving the vehicle to a first location, stopping the vehicle, connecting the engine to the compressor, and withdrawing dry air from the air dehydration membrane,
    c) disconnecting the engine from the compressor, and
    d) driving the vehicle to a second location, stopping the vehicle, connecting the engine to the compressor, and withdrawing dry air from the air dehydration membrane.

8. The method of claim 7, further comprising repeating steps (c) and (d) a plurality of times.

9. The method of claim 7, wherein the vehicle is selected to have a booster compressor connected to an output of the air dehydration membrane, and wherein the connecting and disconnecting steps include connecting and disconnecting the engine to and from the booster compressor.

10. The method of claim 7, further comprising removing liquid water from compressed air produced by the compressor.

11. A portable gas separation system, comprising:
a) a vehicle having an engine,
b) the vehicle comprising means for supporting a compressor and a gas separation membrane, the compressor being connectable to the engine only when the engine is not moving the vehicle,
wherein the gas separation membrane provides oxygen-enriched and nitrogen-enriched gas streams when the vehicle is stationary and the engine is operating the compressor,
further comprising an air dehydration membrane connected to receive compressed air from the compressor, wherein the air dehydration membrane and the gas separation membrane operate in parallel to produce separate streams of dry air and oxygen-enriched and nitrogen-enriched gas.

* * * * *